(12) United States Patent
Erike

(10) Patent No.: US 7,481,897 B2
(45) Date of Patent: *Jan. 27, 2009

(54) METHOD OF PRODUCING A COLD TEMPERATURE HIGH TOUGHNESS STRUCTURAL STEEL

(75) Inventor: Eric C. Erike, Mesa, AZ (US)

(73) Assignees: TRW Automotive U.S. LLC, Livonia, MI (US); Sumitomo Metal Industries Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/982,517

(22) Filed: Nov. 5, 2004

(65) Prior Publication Data

US 2005/0061404 A1   Mar. 24, 2005

Related U.S. Application Data

(63) Continuation-in-part of application No. 10/726,961, filed on Dec. 3, 2003, which is a continuation of application No. 09/944,873, filed on Aug. 31, 2001, now abandoned, which is a continuation-in-part of application No. 09/654,153, filed on Sep. 1, 2000, now Pat. No. 6,386,583.

(51) Int. Cl.
*C22C 38/18* (2006.01)

(52) U.S. Cl. .................. 148/334; 148/651; 148/320

(58) Field of Classification Search .......... 148/651, 148/334, 320, 335
See application file for complete search history.

(56) References Cited

U.S. PATENT DOCUMENTS

| 3,645,725 | A | 2/1972 | Denhard, Jr. et al. |
| 4,765,953 | A | 8/1988 | Hagenfeldt et al. |
| RE33,006 | E | 8/1989 | Hataya et al. |
| 4,892,704 | A | 1/1990 | Sawaragi |
| 5,348,344 | A | 9/1994 | Blumenthal et al. |
| 6,047,747 | A * | 4/2000 | Bowen et al. ............ 420/112 |
| 6,264,760 | B1 * | 7/2001 | Tamehiro et al. ......... 148/336 |
| 6,386,583 | B1 | 5/2002 | Erike |
| 6,878,219 | B2 | 4/2005 | Kondo et al. |

FOREIGN PATENT DOCUMENTS

| JP | 401100222 | * | 4/1989 |
| JP | 402050915 | * | 2/1990 |

(Continued)

OTHER PUBLICATIONS

ASM Handbook, vol. 4 Heat Treating p. 164, Apr. 1993.*

(Continued)

*Primary Examiner*—Scott Kastler
(74) *Attorney, Agent, or Firm*—Tarolli, Sundheim, Covell & Tummino LLP

(57) ABSTRACT

An apparatus includes a low-carbon steel member. The low-carbon steel member yields plastically more than about 5% before fracturing at temperatures down to about −40° C. when stress is applied to the low-carbon steel member sufficient to cause the low-carbon steel member to so yield.

19 Claims, 5 Drawing Sheets

FOREIGN PATENT DOCUMENTS

| | | | |
|---|---|---|---|
| JP | 5-255749 | | 5/1993 |
| JP | 406184635 | * | 7/1994 |
| JP | 409104921 | * | 4/1997 |
| JP | 409111344 | * | 4/1997 |
| JP | 410140238 | * | 5/1998 |
| JP | 410140283 | * | 5/1998 |

OTHER PUBLICATIONS

Treatise entitled "Worldwide Guide to Equivalent Irons and Steels", pp. iii-iv, 5-1 to 5-10, and 5-135-5-137, (ASM Intl. 3$^{rd}$ ed, 1993).

Treatise entitled "Understanding How Components Fail", pp. 83-84, (ASM Intl. 2$^{nd}$ ed, 2000).

Treatise entitled "ASM Specialty Handbook: Carbon and Alloy Steels", pp. 15-22 and 230-232, (ASM Intl. 1996).

* cited by examiner

METHOD OF PRODUCING A COLD TEMPERATURE HIGH TOUGHNESS STRUCTURAL STEEL

FIELD OF THE INVENTION

The present invention is a continuation-in-part of U.S. patent application Ser. No. 10/726,961, filed Dec. 3, 2003, which is a continuation of U.S. patent application Ser. No. 09/944,873, filed Aug. 31, 2001 now abandoned, which is a continuation-in-part of U.S. patent application Ser. No. 09/654,153, filed Sep. 1, 2000 now U.S. Pat. No. 6,386,583 and assigned to the assignee of the present invention. U.S. patent application Ser. Nos. 10/726,961, 09/944,873, and 09/654,153 are all herein incorporated by reference in their entirety.

The present invention relates to a method of producing a low-carbon steel member and a low-carbon steel member formed by the method. The low-carbon steel member can be in the form of a tubular structure that is suitable for storing gas under pressure, such as in an inflator for storing gas for inflating an inflatable vehicle occupant protection device.

BACKGROUND OF THE INVENTION

Metallic materials are frequently used in the production of containers for the storage of gases and gas mixtures. For example, steel can be used to form a storage container (i.e., housing) of an inflator for inflating a vehicle occupant protection device. The inflator housing can contain gases or gas mixtures at elevated pressures.

An inflator housing can be formed from steel. The steel used to form the inflator housing should have sufficient tensile strength to store the a gas or gas mixture at an elevated pressure. The steel should also be resistant to hydrogen embrittlement, and have a toughness sufficient to prevent brittle fracture of the inflator housing when the inflator housing is subjected to temperatures down to about −40° C.

SUMMARY OF THE INVENTION

The present invention relates to an apparatus that comprises a low-carbon steel member. The low-carbon steel member has a high toughness at low temperatures and yields plastically more than about 5% before fracturing at temperatures down to about −40° C. when stress sufficient to cause the low-carbon steel member to so yield is applied to the low-carbon steel member. The low-carbon steel member can be used, for example, to form a housing of an inflator for inflating a vehicle occupant protection device.

The present invention also relates to a method of forming a low-carbon steel member. In the method, the low-carbon steel member is cold worked and then heat treated prior to finishing the low-carbon steel member. The heat treating can comprise heating the low-carbon steel member to a temperature of at least about 900° C., cooling the low-carbon steel member to room temperature, and tempering the low-carbon steel member to a temperature of at least about 500° C. Alternatively, the heat treating can comprise induction heating the low-carbon steel member to a temperature of at least about 900° C. and cooling the low-carbon steel member to room temperature. The cold worked and heat treated low-carbon steel member yields plastically more than about 5% before fracturing at temperatures down to about −40° C. when stress sufficient to cause the low-carbon steel member to so yield is applied to the low-carbon steel member.

The present invention also relates to a method of forming a low-carbon steel tube. In the method, a billet that has a diameter is cast from a low-carbon steel. The diameter of the billet of low-carbon steel is reduced by hot-rolling the billet. A tube is formed having an annular wall by piercing the billet. The thickness of the annular wall is reduced by cold drawing the tube. The tube is heat treated after the cold drawing to form a low-carbon steel tube that yields plastically more than about 5% before fracturing at temperatures down to about −40° C. when stress sufficient to cause the low-carbon steel tube to so yield is applied to the low-carbon steel tube. The heat treating can comprise heating the tube to a temperature of at least about 900° C., cooling the tube to room temperature, and tempering the tube to a temperature of at least about 500° C. Alternatively, the heat treating can comprise induction heating the tube to a temperature of at least about 900° C. and cooling the tube to room temperature.

BRIEF DESCRIPTION OF THE DRAWINGS

The foregoing and other features of the invention will become more apparent to one skilled in the art upon consideration of the following description of the invention and the accompanying drawings in which.

DETAILED DESCRIPTION

Figure 1:
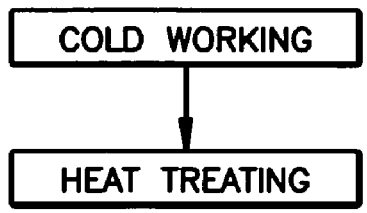
FIG. 1 is a schematic block diagram illustrating a method of producing a low-carbon steel member in accordance with an aspect of the invention.

The present invention relates to a low-carbon steel member that can comprise, for example, at least a portion of a housing of an inflator for actuating a vehicle occupant protection device. The low-carbon steel member has a substantially improved toughness at low temperatures (e.g., below −40° C.) compared to a conventional low-carbon steel member. For example, a low-carbon steel member formed in accordance with the present invention can yield plastically more than about 5% before fracturing at temperatures down to about −40° C. when stress sufficient to cause the low-carbon steel member to so yield is applied to the low-carbon steel member. This is in contrast to a conventional low-carbon steel member, which does not yield plastically at temperatures down to about −40° C.

By "low-carbon steel" as used in the specification and in the claims, it is meant a carbon steel, which contains up to about 0.30%, by weight, carbon. A steel is considered to be a carbon steel by the American Iron and Steel Institute (AISI) when the following criteria are met. (1) The steel's properties or characteristics (e.g., microstructure, tensile strength, yield strength, and elongation at break) are determined principally by its carbon content. (2) The steel contains only incidental amounts of other alloying elements (e.g., less than about 2% for each alloying element) other than silicon, manganese, copper, sulfur, and phosphorus. (3) No minimum content is specified or required for chromium, cobalt, niobium (i.e., columbrian), molybdenum, nickel, titanium or any other element to be added to obtain a desired alloy effect. (4) The specified minimum for copper does not exceed 0.40%. (5) The maximum content specified for any of the following elements does not exceed the percentages noted: manganese 1.65%, silicon 0.60%, and copper 0.60%.

Carbon steels comprise the 1XXX grades in the Society of Automotive Engineers-AISI (SAE-AISI) system and are subdivided into four distinct grades-10XX grade, 11XX grade, 12XX grade, and 15XX grade. Examples of low-carbon 10XX grade steels that can be used in accordance with the present invention include SAE-AISI 1005, 1006, 1008, 1010, 1012, 1013, 1015, 1016, 1017, 1018, 1019, 1020, 1021, 1022, 1023, 1025, 1026, 1029, 1030, and 1035 grade steels. Examples of low-carbon 11XX grade steels that can be used in accordance with the present invention include SAE-AISI 1108, 1110, and 1117 grade steels. Examples of low-carbon 12XX grade steels that can be used in accordance with the present invention include SAE-AISI 1211, 1212, 1213, 1215, and 12L14 grade steels. Examples of low-carbon 15XX grade steels that can be used in accordance with the present invention include SAE-AISI 1510, 1513, 1522, 1524, 1526, 1527, and 1536 grade steels.

It will be appreciated by one skilled in the art that other low-carbon steels can be used in accordance with the present invention. These other low-carbon steels can include variations of SAE-AISI 1XXX grade steel.

One example of a variation of an SAE-AISI 1XXX grade steel is an SAE-AISI 1010 grade steel in which the composition is controlled so that the weight percent of carbon does not exceed about 0.12%, the weight percent of sulfur does not exceed about 0.015%, the weight percent of phosphorous does not exceed about 0.020%, the weight percent of chromium does not exceed about 1.30%, the weight percent of molybdenum does not exceed about 0.60%, and the combined weight percent of phosphorous and sulfur does not exceed about 0.025%. This low-carbon steel composition has increased strength, better corrosion resistance, and better overall structural integrity compared to conventional low-carbon SAE-AISI 1XXX grade steel.

Figure 5:
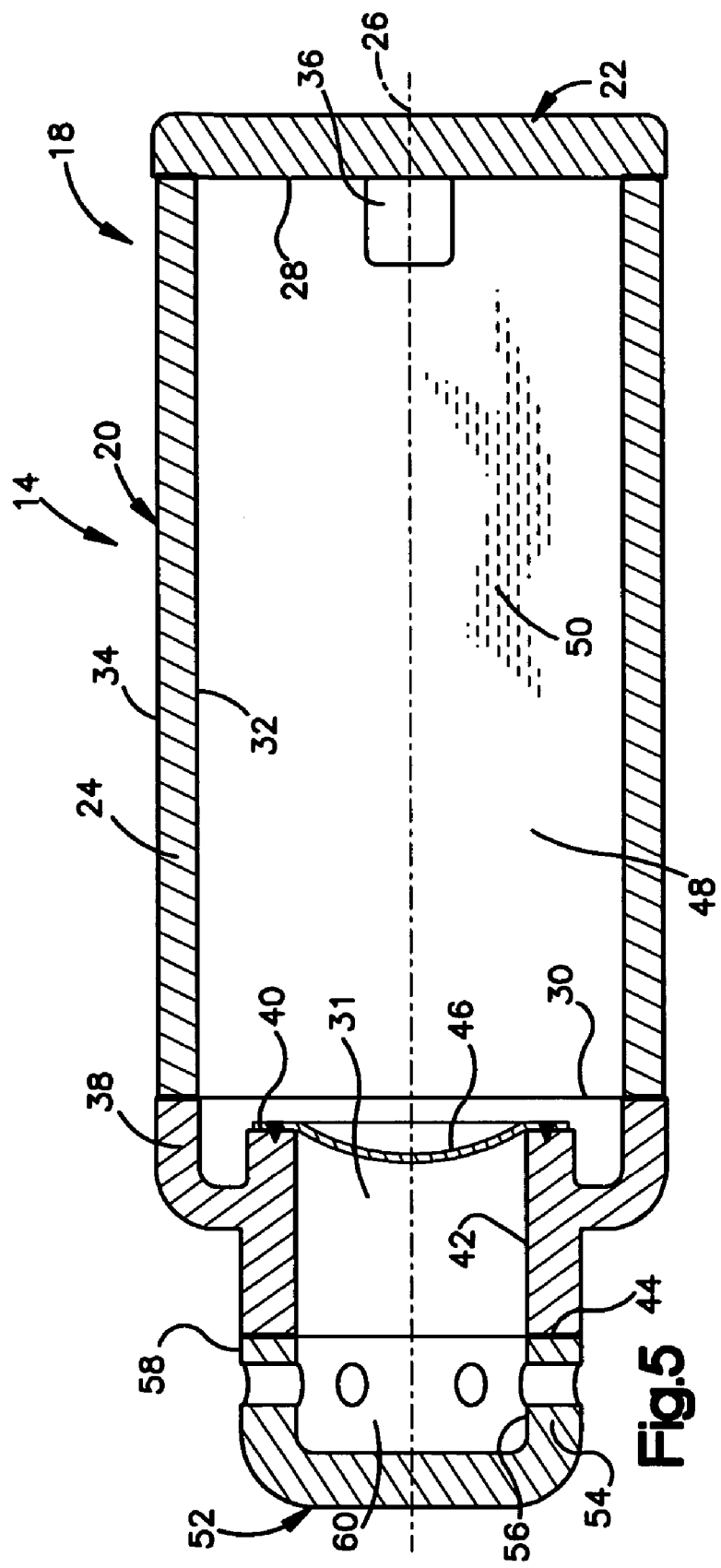
FIG. 5 is a sectional view of part of the apparatus of FIG. 4.

Another example of a variation of an SAE-AISI 1XXX grade steel that is particularly suited for use in an inflator housing of a vehicle occupant protection apparatus, such as shown and described with respect to FIG. 5, consists essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron. By residual elements, it is meant the combined weight of additional elements including, for example, titanium, lead, niobium, cobalt, calcium, and/or tin.

Yet another example of a variation of an SAE-AISI 1XXX grade steel that is particularly suited for use in an inflator housing of a vehicle occupant protection apparatus, such as shown and described with respect to FIG. 5, consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron. By residual elements, it is meant the combined weight of additional elements including, for example, titanium, lead, niobium, cobalt, calcium, and/or tin.

In these variations of an SAE-AISI 1XXX grade steel, that are particularly suited for use in an inflator housing of a vehicle occupant protection apparatus, such as shown and described with respect to FIG. 5, the carbon increases the strength of the steel, but decreases the ductility of the steel and the resistance of the steel to hydrogen embrittlement and stress corrosion cracking. When the carbon content of the steel is less than about 0.07% by weight, the steel may not have sufficient strength to be used in the housing of the inflator. When the carbon content is greater than about 0.20% by weight, the steel can be too susceptible to hydrogen embrittlement and stress corrosion cracking to be used in a housing of the inflator.

The manganese increases the strength and toughness of the steel, but decreases the ductility and resistance of the steel to hydrogen embrittlement and stress corrosion cracking. The manganese content is determined in relation to the carbon content. When the manganese content is greater than about 1.60% by weight, the steel can be too susceptible to hydrogen embrittlement and stress corrosion cracking to be used in a housing of an inflator.

The phosphorous decreases the creep and rupture strength of the steel and resistance of the steel to hydrogen embrittlement. When the phosphorous content is greater than 0.030% by weight, the steel can too susceptible to hydrogen embrittlement to be used in a housing of an inflator.

Sulfur, like phosphorous, decreases the creep and rupture strength of steel and resistance of the steel to hydrogen embrittlement. When the sulfur content is greater than 0.025% by weight, the steel can be too susceptible to hydrogen embrittlement to be used in a housing of an inflator.

Silicon increases the strength of the steel and the oxidation resistance of the steel. Silicon also decreases the workability (i.e., increases the work hardening rate) of the steel. When the silicon content of the steel is less than about 0.06% by weight, the steel can be noticeably susceptible to oxidation during formation and welding of the steel. Oxidation of the steel degrades the strength and toughness of the steel. When the silicon content of the steel is greater than about 0.35% by weight, the workability of the steel can degrade so that the steel cannot be readily processed into a housing of an inflator.

Chromium increases the corrosion resistance and oxidation resistance of the steel, but decreases the workability (i.e., increases the work hardening rate) of the steel. When the chromium content of the steel is greater than about 1.20% by weight, the workability of the steel can degrade so that the steel cannot be readily processed into a housing of an inflator.

Nickel increases the ductility of the steel and corrosion resistance of the steel, but decreases the workability (i.e., increases the work hardening rate) of the steel. When the nickel content of the steel is greater than about 0.65% by weight, the workability of the steel degrades so that the steel cannot be readily processed into a housing of an inflator.

Molybdenum increases the corrosion resistance and oxidation resistance of the steel, but decreases the workability (i.e., increases the work hardening rate) of the steel. The molybdenum content is determined in relation with the chromium content. When the molybdenum content is greater than about 0.70% by weight, the workability of the steel can degrades so that the steel cannot be readily processed into a housing of an inflator.

Copper increases the corrosion resistance of steel, but decreases the resistance of the steel to stress corrosion cracking. When the copper content of the steel is greater than about 0.35% by weight, the steel is too susceptible to stress corrosion cracking to be used in a housing of an inflator.

Aluminum improves the corrosion resistance, the workability, and the ductility of the steel. When the aluminum content of the steel is at least about 0.02% by weight, the corrosion resistance, workability, and ductility of the steel noticeably increase. When the aluminum content of the steel is greater than about 0.06% by weight, the workability of the steel can degrade so that the steel cannot be readily processed into a housing of an inflator.

Vanadium increases the corrosion resistance and abrasion resistance of the steel. When the vanadium content is greater than about 0.10%, the workability of the steel degrades so that the steel cannot be readily processed into a housing of an inflator.

Referring to FIG. 1, the toughness of the low-carbon steel member can be substantially improved by cold working (e.g., cold rolling, cold drawing, or cold extrusion) a low-carbon steel member during the last substantial reduction in thickness (e.g., at least about 5%) that the low-carbon member undergoes and heat treating the cold worked, low-carbon steel member. The cold working and heat treating of the low-carbon steel are performed after casting of the low-carbon steel member and any hot-working operation, such as hot extruding, hot spinning, hot deep drawing, hot piercing, or hot rolling, but prior to any finishing operations, such as surface finishing (e.g., temper rolling, cleaning, or polishing) straightening, bending, threading, or cutting. It is believed that by only cold working and heat treating the low-carbon steel member after any hot working but prior to finishing, the grain growth of the low-carbon steel member can be substantially minimized and a low-carbon steel member can be formed with microstructure that has a substantially random grain orientation. A minimized grain growth and a random grain orientation are advantageous because the tensile strength and ductility of the low-carbon steel at low temperatures (e.g., less than about −40° C.) are substantially enhanced.

Cold working in accordance with the present invention is a process of reducing the cross-sectional area of the low-carbon steel member by cold drawing, cold rolling, or cold extrusion of the low-carbon steel member at a temperature that is cold enough to prevent spontaneous recrystallization of the grains of the low-carbon steel during working (e.g., rolling, drawing, or extruding). This temperature is typically about room temperature, but can be as high as about 500° C. depending on the specific low-carbon steel composition. By "room temperature", as used in the specification and the claims, it is meant a temperature that is less than about 100° C. and, preferably, a temperature that is about 25° C.

When low-carbon steel is cold worked in any way, its mechanical properties are changed. The most noticeable effects are a decrease in ductility and an increase in strength (e.g., tensile strength and/or yield strength) of the cold worked low-carbon steel member. This decrease in ductility can be mitigated by the subsequent heat treatment process.

Figure 2:
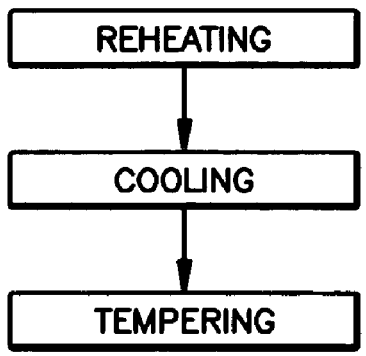
FIG. 2 is a schematic block diagram illustrating one aspect of the heat treatment step of FIG. 1.

As illustrated schematically in FIG. 2, the low-carbon steel member can be heat treated by transferring the cold worked low-carbon steel member to a heating chamber of a reheating furnace and heating the low-carbon to a temperature of at least about 900° C. and, preferably, about 920° C. The heat is supplied to the heating chamber of the reheating furnace by combusting a gaseous or liquid fuel.

The low-carbon steel member is maintained at a temperature of at least about 900° C. within the heating chamber for at least about 15 minutes. Preferably the low-carbon steel member is maintained at a temperature of at least about 900° C. within the heating chamber for at least about 20 minutes.

The low-carbon steel member after being heated within the chamber for at least about 15 minutes is cooled to room temperature. The low-carbon steel member can be cooled to room temperature, for example, by quenching the steel member with sprayed water and then placing the low-carbon steel member in an air atmosphere, which is at room temperature.

Once the low-carbon steel is at room temperature, the low-carbon steel member is tempered until the temperature of the low-carbon steel member reaches about 500° C. Upon reaching a temperature of about 500° C., the low-carbon steel member is cooled to room temperature by placing the low-carbon steel member in an air atmosphere, which is at room temperature.

The low-carbon steel member heat treated by this process has a tensile strength of at least about 130,000 psi, a yield strength of at least about 104,000 psi, and an elongation at break of at least about 14%. The low-carbon steel member heat treated by this process also remains ductile at temperatures down to about −40° C. By "ductile", it is meant that when stress is applied to the low-carbon steel member effective to cause the low-carbon steel member to fracture, the low-carbon steel member demonstrates substantial plastic deformation before fracturing. Preferably, the low-carbon steel member yields plastically at least about 5% before fracturing, when stress effective to cause the low-carbon steel member to so yield is applied to the low-carbon steel member.

In contrast to the low-carbon steel member of the present invention, a low-carbon steel member formed by conventional processes (e.g., annealing and then cold drawing) is brittle at low temperatures. For example, at temperatures of about −40° C., a low-carbon steel member of 1010 low-carbon steel formed by conventional processes is brittle and fractures with little or no permanent deformation (i.e., yields plastically less than 5%) when a stress effective to cause the 1010 low-carbon steel member to so yield is applied to the 1010 low-carbon steel member.

Figure 3:
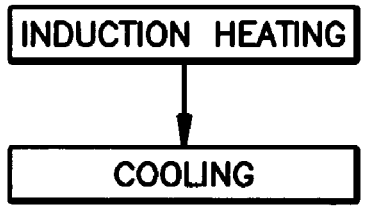
FIG. 3 is a schematic block diagram illustrating another aspect of the heat treatment step of FIG. 1.

Alternatively, as shown schematically in FIG. 3, the cold worked low-carbon steel member can be heat treated by transferring the cold worked low-carbon steel member to a heating chamber of an induction furnace and induction heating the low-carbon steel member to a temperature of at least about 900° C. and, preferably, about 920° C. The heat is supplied to the heating chamber of the induction furnace by an electrical coil that surrounds the induction heating chamber.

The low-carbon steel member is maintained at a temperature of at least about 900° C. within the heating chamber for at least about 15 minutes. Preferably, the low-carbon steel member is maintained at a temperature of at least about 900° C. within the heating chamber for at least about 20 minutes.

The low-carbon steel member after being heated within the heating chamber of the induction furnace for at least about 15 minutes is cooled to room temperature, for example, by quenching the low-carbon steel member with sprayed water and then placing the low-carbon steel member in an air atmosphere, which is at room temperature.

It was found that a low-carbon steel member in this heat treatment process did not have to be tempered, after quenching, in order to improve the toughness of the low-carbon steel member at low temperatures. The low-carbon steel member heat treated by this process has a tensile strength of at least about 130,000 psi, a yield strength of at least about 104,000 psi, and an elongation at break of at least about 14%. Surprisingly, it was found that the low-carbon steel member heat treated by this process remains ductile at temperatures down to about −100° C. It is believed that the induction furnace heats the low-carbon steel member quicker and more uniformly than a conventional fuel furnace, and that this quicker and more uniform heating provides the low-carbon steel member with its improved ductility down to −100° C.

Figure 4:
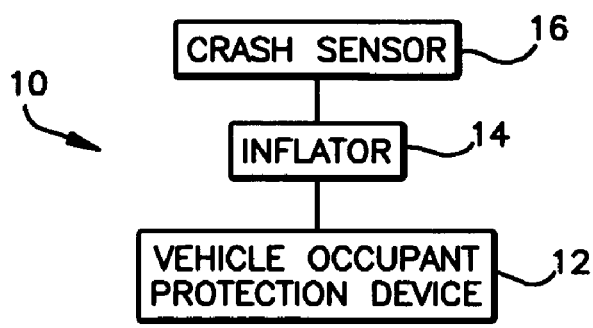
FIG. 4 is a schematic view of a vehicle occupant protection apparatus in accordance with another aspect of the present invention.

In accordance with another aspect of the invention, the low-carbon steel member can be used to form a housing of an inflator of a vehicle occupant protection apparatus. Referring to FIG. 4, the vehicle occupant protection apparatus 10 includes an inflatable vehicle occupant protection device 12. The inflatable vehicle occupant protection device 12 can be an air bag. The inflatable vehicle occupant protection device 12 can also be, for example, an inflatable seat belt, an inflatable knee bolster, an inflatable head liner, an inflatable side curtain, or a knee bolster operated by an air bag.

An inflator 14 is associated with the vehicle occupant protection device 12. The inflator 14 is actuatable to direct inflation fluid to the inflatable vehicle occupant protection device 12 to inflate the inflatable vehicle occupant protection device 12.

The system also includes a crash sensor 16. The crash sensor 16 is a known device that senses a vehicle condition, such as vehicle deceleration, indicative of a collision. When the crash sensor 16 senses a vehicle condition for which inflation of the inflatable vehicle occupant protection device is desired, the crash sensor either transmits a signal or causes a signal to be transmitted to actuate the inflator 14. The inflatable vehicle occupant protection device 12 is then inflated and extends into the occupant compartment of the vehicle to help protect a vehicle occupant from a forceful impact with parts of the vehicle.

The inflator 14, in one embodiment of the invention, can be a heated gas inflator, such as disclosed in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc.

Referring to FIG. 5, the inflator 14 includes a housing 18. The housing 18 includes a container 20. The container 20 includes a generally annular side wall 24 extending along a central axis 26 between a first open end 28 of the annular side wall 24 and a second open end 30 of the annular side wall 24. The annular side wall 24 includes an annular inner surface 32 and an annular outer surface 34.

The housing 18 further includes an end cap 22 secured to the first open end 28 of the annular side wall 24 by a weld. The end cap 22 supports an actuatable pyrotechnic igniter 36. The igniter 36 includes suitable ignitable material (not shown).

The housing 18 also includes an end wall 38 secured to the second open end 30 of the annular side wall 24 by any suitable means, such as a weld. The end wall 38 includes a radially extending first surface 40 and an axially extending cylindrical surface 42. The surfaces 40 and 42 are centered on the axis 26. The cylindrical surface 42 of the end wall 38 has a diameter smaller than the diameter of the inner surface 32 of the annular side wall 24 and extends axially between and connects the first surface 40 of the end wall 38 and a radially extending second surface 44 of the end wall 38. The cylindrical surface 42 defines a passage 31 through the end wall 38.

A burst disk 46 is secured to the first surface 40 of the end wall 38 by any suitable means, such as a weld. The burst disk 46 closes the passage 31. Together, the burst disk 46 and the end wall 38 close the second open end 30 of the annular side wall 24 to define a closed chamber 48 in the container 20. The chamber 48 is defined by the end wall 38, the burst disk 46, the annular side wall 24, and the end cap 22.

A supply of gas 50 for inflating the inflatable vehicle occupant protection device 12 is stored in the chamber 48. The supply of gas 50 comprises at least one inert gas. The preferred inert gas is nitrogen, argon, or a mixture of nitrogen and argon.

The supply of gas 50 also includes an oxidizer gas and a combustible fuel gas. A preferred oxidizer gas is oxygen. Preferred fuel gases include hydrogen, nitrous oxide, and/or methane. Alternatively, the stored gas 50 may comprise a mixture of air and hydrogen. Preferably, the stored gas 50 includes at least a small amount of a tracer gas, such as helium, for helping to detect gas leaks, as is known.

The stored gas 50 within the container 48 is under pressure. The pressure depends upon such factors as the volume of the inflatable vehicle occupant protection device 12 to be inflated, the time available for inflation, the inflation pressure desired, and the volume of the chamber 48 storing the gas. The stored gas 50 in the chamber 48 is typically at a pressure of about 2,000 to about 8,000 pounds per square inch (psi). Preferably, the stored gas 50 in the chamber 48 is at a pressure of about 3,000 psi to about 4,000 psi.

A diffuser 52 is connected to the second surface 44 of the end wall 38 by any suitable means, such as a weld. The diffuser 52 includes a cylindrical side wall 54 coaxial with the annular side wall 24 of the container 20 and centered on the axis 26. The side wall 54 includes a cylindrical inner surface 56 and cylindrical outer surface 58. The diffuser 52 has a central chamber 60. The chamber 60 is in fluid communication with the passage 31 in the end wall 38.

The annular side wall 24 of the housing 18 comprises a seamless tube that is formed from a low-carbon steel in accordance with the present invention. The low-carbon steel can comprise, for example, a low-carbon SAE-AISI 10XX grade steel, 11XX grade steel, 12XX grade, 15XX grade steel, or variations of SAE-AISI 1XXX grade steel. It will be appreciated by one skilled in the art that other low-carbon steels can also be used.

Figure 6:
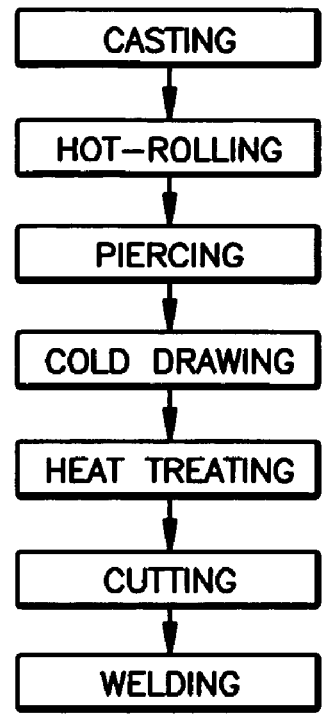
FIG. 6 is a schematic block diagram illustrating a method of producing a seamless tube in accordance with yet another aspect of the present invention.

FIG. 6 is a schematic illustration of a method of forming the seamless, low-carbon steel tube in accordance with the present invention. In the method, a cylindrical billet is cast from the low-carbon steel. The cylindrical billet of low-carbon steel can have a uniform diameter along the entire length of the billet. For example, the diameter of the cylindrical billet can be about 150 mm to about 200 mm.

The cast cylindrical billet of low-carbon steel is hot rolled to reduce the diameter of the cylindrical billet. Hot-rolling involves passing a heated cylindrical billet of steel through a rolling mill. A rolling mill typically has two rolls revolving at the same peripheral speed and in opposite directions about their respective axes, i.e., clockwise and counter clockwise. Each roll has an annular groove. The annular grooves are aligned with each other and define a round pass with a diameter somewhat less than the diameter of the cylindrical billet of steel passing between the rolls. In operation, the rolls grip the cylindrical billet of steel and deliver it reduced in diameter and increased in length.

By way of example, the cylindrical billet of low-carbon steel is heated to a temperature of about 900° C. to about 1200° C. and, while at the temperature of about 900° C. to about 1200° C., is passed through the rolling mill. Preferably, the cylindrical billet is heated to a temperature of about 1200° C. and, while at a temperature of about 1200° C., is passed through the rolling mill.

The cylindrical billet of low-carbon steel can be passed through the rolling mill at least once to reduce the diameter of the cylindrical billet. The diameter of the cylindrical billet of low-carbon steel can also be reduced in multiple passes through the rolling mill, with each pass slightly reducing the diameter of the cylindrical billet.

The diameter of the cylindrical billet of low-carbon steel is preferably reduced at least about 50% during the hot-rolling step of the present invention. For example, the diameter of a cylindrical billet can be reduced by hot-rolling from about 190 mm to about 75 mm.

The hot-rolled cylindrical billet of low-carbon steel can be formed into a seamless tube by passing the cylindrical billet through a known piercing mill. The cylindrical billet of low-carbon steel can be heated to an elevated temperature and, while at the elevated temperature, passed through the piercing mill. For example, the cylindrical billet is heated to a temperature of about 1000° C. to about 1500° C. and, while at a temperature of about 1000° C. to about 1500° C., the cylindrical billet is passed through the piercing mill.

The seamless tube of low-carbon steel so formed has an annular wall with a thickness uniform along the axis of the tube and circumferentially around the tube. The outer diameter of the annular wall is substantially less than the diameter of the hot-rolled cylindrical billet. The length of the seamless tube is substantially longer than the length of the hot-rolled cylindrical billet.

The seamless tube of low-carbon steel is cooled to room temperature, for example, by quenching the tube with sprayed water and then placing the tube in an air atmosphere, which is at room temperature. Once the temperature of the tube is at room temperature, the tube may be pickled in an acid solution to remove any scale or oxides formed during piercing on the inner or outer surface of the annular wall. Suitable pickling solutions may include sulfuric acid, phosphoric acid, nitric acid, hydrochloric acid, and combinations thereof.

The annular wall of the seamless tube of low-carbon steel is then reduced in thickness by cold drawing the seamless tube. Cold drawing involves pulling a tube, which has not been heated to an elevated temperature, through an annular die, the hole in which is smaller than the outer diameter of the tube being drawn. At the same time, the inner surface of the tube is supported by a mandrel anchored on the end of a rod so that the tube remains in the plane of the die during the drawing operation.

The seamless tube of low-carbon steel can be passed through the die at least once to reduce in thickness the annular wall of the seamless tube. The annular wall of the seamless tube can be reduced in thickness by multiple passes of the tube through the die with each pass slightly reducing the thickness of the annular wall.

The seamless tube of low-carbon steel in the present invention may be lubricated with an oil based or water based emulsion prior to cold drawing in order to reduce the heat generated by friction as the seamless tube passes through the die.

The thickness of the annular wall after cold drawing can be uniform along the axis of the tube and circumferentially around the tube. The thickness of the annular wall can be substantially less than the thickness of the annular wall prior to cold drawing. For example, the seamless tube of low-carbon steel after cold drawing can have an outer diameter of about 55 mm to about 65 mm and a wall thickness of about 2.5 mm to about 4 mm. Preferably, the seamless tube of low-carbon steel, after cold drawing, has an outer diameter of about 60 mm and a wall thickness of about 3 mm.

The seamless tube of low-carbon steel can be polished to remove objectionable pits and surface blemishes and then heat treated to improve the toughness of the seamless tube at low temperatures (e.g., temperatures down to about −40° C.)

The seamless tube of low-carbon steel can be heat treated by transferring the seamless tube to a heating chamber of a reheating furnace and heating the seamless tube to a temperature of at least about 900° C. and, preferably, about 920° C. The seamless tube of low-carbon steel is maintained at a temperature of at least about 900° C. within the heating chamber for at least about 15 minutes. The seamless tube of low-carbon steel after being heated within the chamber for at least about 15 minutes is cooled to room temperature, for example, by quenching the seamless tube with sprayed water and then placing the seamless tube in an air atmosphere, which is at room temperature. Once the seamless tube of low-carbon steel is at room temperature, the seamless tube is tempered until the temperature of the seamless tube reaches about 500° C. Upon reaching a temperature of about 500° C., the tube is cooled to room temperature, for example, by placing the tube in an air atmosphere, which is maintained at room temperature.

The seamless tube of low-carbon steel heat treated by this process has a tensile strength of at least about 130,000 psi, a yield strength of at least about 104,000 psi, an elongation at break of at least about 14%, and remains ductile at temperatures down to about −40° C.

Alternatively, the seamless tube of low-carbon steel can be heat treated by transferring the cold drawn seamless tube to a heating chamber of an induction furnace and induction heating the seamless tube to a temperature of at least about 900° C. and, preferably, about 920° C. The seamless tube of low-carbon steel is maintained at a temperature of at least about 900° C. within the heating chamber for at least about 15 minutes. Preferably, the seamless tube is maintained at a temperature of at least about 900° C. within the heating chamber for at least about 20 minutes. The seamless tube of low-carbon steel after being heated within the heating chamber of the induction furnace for at least about 15 minutes is cooled to room temperature, for example, by quenching the tube with sprayed water and then placing the seamless tube in an air atmosphere, which is at room temperature.

The seamless tube of low-carbon steel heat treated by this process has a tensile strength of at least about 130,000 psi, a yield strength of at least about 104,000 psi, an elongation at break of at least about 14%, and remains ductile at temperatures down to about −100° C.

The heat treated seamless tube of low-carbon steel is cut to length and welded to an end cap, such as cap 22 (FIG. 5), of low-carbon steel and an end wall, such as wall 38, of low-carbon steel. The end wall is also welded to a diffuser, such as diffuser 52, of low-carbon steel. The low-carbon steel employed in the end cap, the end wall, and diffuser preferably can have essentially the same steel composition as the low-carbon steel that is used to form the seamless tube.

The heat-treated seamless tube cut to length, end cap, end wall, and diffuser are welded together by any suitable means, such as friction welding, autogenous gas tungsten arc welding, electron beam welding, or laser welding. Preferably, the seamless tube, end cap, end wall, and diffuser are welded together by laser welding or friction welding.

The following examples are included to demonstrate various aspects of the invention. Those of skill in the art should, in light of the present disclosure, appreciate that many changes can be made in the specific aspects that are disclosed and still obtain a like or similar result without departing from the spirit and scope of the invention.

EXAMPLES

Example 1

A low-carbon steel tube was prepared from a cylindrical billet of low-carbon steel. The cylindrical billet had a length of about 3 meters and a diameter of about 190 millimeters. The cylindrical billet of low-carbon steel was cast from a low-carbon steel that consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

The cylindrical billet was heated to a temperature of about 1200° C. and, while at 1200° C., was passed through a rolling mill to reduce the diameter of the cylindrical billet. The diameter of the cylindrical billet was reduced by the hot-rolling from about 190 mm to about 75 mm.

The hot-rolled cylindrical billet was maintained at a temperature of about 1200° C. and, while at 1200° C., passed through a piercing mill to form a seamless tube with a uniform wall thickness along the entire axis of the tube and circumferentially entirely around the tube.

After piercing, the tube was allowed to cool until the temperature of the tube reached room temperature. Once at room temperature, the thickness of the annular wall of the tube was reduced by cold drawing the tube. The thickness of the annular wall of the tube after cold drawing was about 3 mm.

The tube was then heat treated by heating the tube in a reheating furnace to a temperature of about 920° C. for about 20 minutes. The tube was then quenched with sprayed water and cooled to room temperature (i.e., about 25° C.) by placing the tube in an air atmosphere, which was at room temperature. Once the tube was at room temperature, the tube was tempered until the temperature of the tube reached about 500° C. Upon reaching a temperature of about 500° C., the tube was cooled to room temperature by placing the tube in an air atmosphere, which was at room temperature. The cooled tube was then cut to the desired length.

The tube so formed was tested in accordance with ASTM E8/E8M and DIN/EN 10002. The tube exhibited outstanding mechanical properties including a tensile strength of at least about 130,000 psi, a yield strength of at least about 104,000 psi, and an elongation at break of at least about 14%.

The ductility of the low-carbon steel tube at a temperature of about −40° C. was also tested by performing a hydraulic burst test at about −40° C. In the burst test, a sample of the low-carbon steel tube was cooled to a temperature of about −40° C. by placing the sample of the low-carbon steel tube in an ethyl alcohol bath that was mixed with dry ice. The temperature of the sample was measured with a thermocouple connected to a Fluke temperature indicator. Once the temperature of the sample decreased to about −40° C., the sample was removed from the bath and connected to a Haskel Hydropneumatic High Pressure Pump. An ethyl alcohol pressure medium, which was maintained at a temperature of about −40° C., was pumped by the high pressure pump into the low-carbon steel tube to increase the pressure within the low-carbon steel tube. The pressure within the low-carbon steel tube was measured using a Dynisco pressure transducer connected to a Daytronic strain gauge conditioner with a peak pressure detector. The pressure within the low-carbon steel tube was increased until the low-carbon steel tube burst. The time to burst was between about 20 and 30 seconds.

Figure 7:
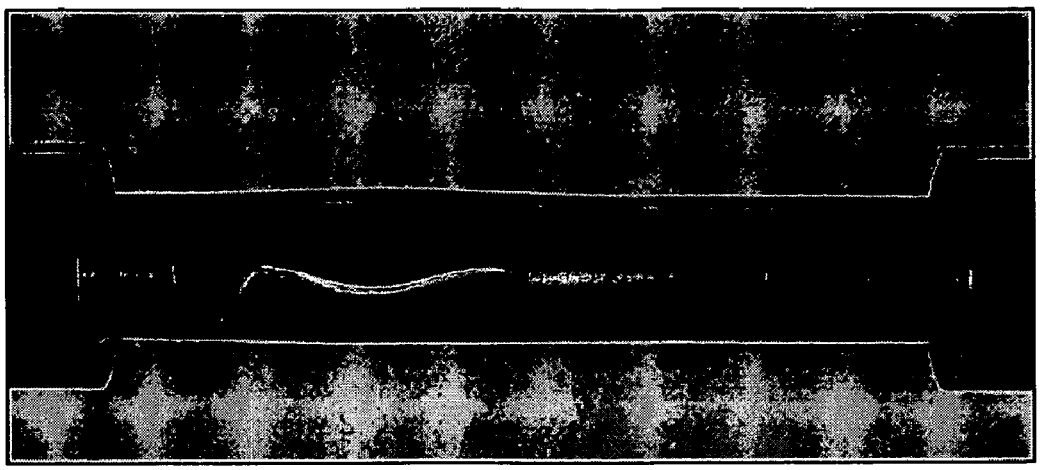
FIG. 7 is a picture showing the results of a burst test performed at −40° C. on a seamless tube prepared in accordance with the present invention.

FIG. 7 is a picture showing the area where the low-carbon steel tube burst. A visual inspection showed that there was no fracture propagation beyond the bulged area where the low-carbon steel tube burst. The absence of fracture propagation beyond the bulged area where the low-carbon steel tube burst indicates that the low-carbon steel tube remained ductile at a temperature down to about −40° C.

The low-carbon steel tube was also tested for susceptibility to hydrogen embrittlement and stress corrosion cracking.

The tube cut to the desired length was laser welded to an end cap, such as cap 22 (FIG. 5), of low-carbon steel and an end wall, such as wall 38, of low-carbon steel. The end wall was also welded to a diffuser, such as diffuser 52, of low-carbon steel. The composition of the low-carbon steel employed in the end cap, end wall, and diffuser was selectively controlled such that the low-carbon steel consisted essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

A c-ring type specimen was removed from the welded portion of the housing and placed in a 3% NaCl saturated air atmosphere. The c-ring type specimen was maintained at 25° C. and subjected to 1.5V from a Ag/AgCl hydrogen cathode charging mechanism (NACE TM0177 Method C). Stress equivalent to 100% of the actual yield strength was applied to the c-ring sample for one month.

Analysis by thermal absorption spectrometry and scanning electron microscopy revealed no evidence of hydrogen embrittlement in the welded portion or base metal surrounding the welded portion of the c-ring type specimen after the one month period.

Additionally, a c-ring type specimen was removed from a welded portion of the housing and placed in a 3% NaCl saturated air atmosphere at 80° C. (NACE TM0177 Method C) Stress equivalent to 100% of the actual yield strength was applied to the c-ring sample for one month.

Analysis by thermal absorption spectrometry and scanning electron microscopy revealed no evidence of stress corrosion cracking in the welded portion or base metal surrounding the welded portion of the c-ring type specimen after the one month period.

Comparative Example 1

A comparative low-carbon steel tube was prepared from a cylindrical billet that was cast using a low-carbon steel that had the same composition as the low-carbon steel of Example 1.

The process for producing the comparative low-carbon steel tube from the cylindrical billet, however, differed from the process of Example 1.

In the process, a cylindrical billet, which had a length of about 3 meters and a diameter of about 190 millimeters, was heated to a temperature of about 1200° C. and, while at 1200° C., was passed through a piercing mill to form a seamless tube with a uniform wall thickness along the entire axis of the tube and circumferentially entirely around the tube.

After piercing, the tube was allowed to cool until it reached room temperature. Once at room temperature, the thickness of the annular wall of the tube was reduced by cold drawing the tube. The thickness of the annular wall of the tube after cold drawing was about 3 mm.

The tube was annealed at a temperature of about 520° C. for about 45 minutes, cooled to room temperature, and cut to the desired length.

The comparative low-carbon steel tube so formed was tested in accordance with ASTM E8/E8M and DIN/EN 10002. The tube exhibited outstanding mechanical properties including a tensile strength of at least about 130,000 psi, a yield strength of at least about 104,000 psi, and an elongation at break of at least about 14%.

The ductility of the comparative low-carbon steel tube at a temperature of about −40° C. was also tested by performing a burst test at about −40° C. on the comparative low-carbon steel tube. In the burst test, a sample of the comparative low-carbon steel tube was cooled to a temperature of about −40° C. by placing the sample of the comparative low-carbon steel tube in an ethyl alcohol bath that was mixed with dry ice. The temperature of the sample was measured with a thermocouple connected to a Fluke temperature indicator. Once the temperature of sample decreased to about −40° C., the sample was removed from the bath and connected to a Haskel Hydro-neumatic High Pressure Pump. An ethyl alcohol pressure medium, which was maintained at a temperature of about −40° C., was pumped by the high pressure pump into the comparative low-carbon steel tube to increase the pressure within the comparative low-carbon steel tube. The pressure within the comparative low-carbon steel tube was measured using a Dynisco pressure transducer connected to a Daytronic strain gauge conditioner with a peak pressure detector. The pressure within the comparative low-carbon steel tube was increased until the comparative low-carbon steel tube burst. The time to burst was between about 20 and 30 seconds.

Figure 8:
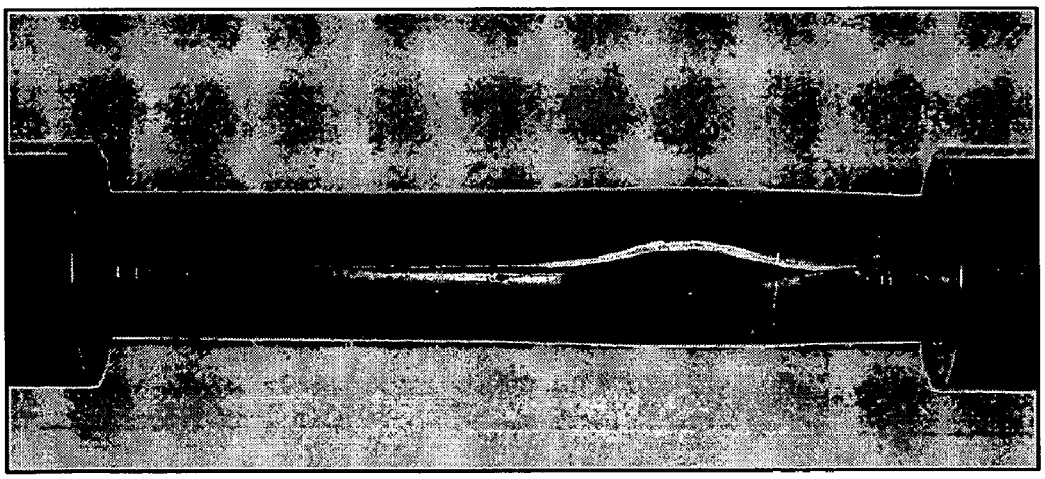
FIG. 8 is a picture showing the results of a burst test performed at −40° C. on a comparative seamless tube.

FIG. 8 is a picture showing the area where the comparative low-carbon steel tube burst. A visual inspection showed that there was fracture propagation beyond the bulged area where the low-carbon steel tube burst. The presence of fracture propagation beyond the bulged area where the low-carbon steel tube burst indicates that the low-carbon steel tube was brittle at temperatures of about −40° C.

Example 2

A low-carbon steel tube was prepared from a cylindrical billet of low-carbon steel. The cylindrical billet had a length of about 3 meters and a diameter of about 190 millimeters. The cylindrical billet of low-carbon steel was cast from a low-carbon steel that consisted essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron. By residual elements, it is meant the combined weight of additional elements including, for example, titanium, lead, niobium, cobalt, calcium, and/or tin.

The cylindrical billet was heated to a temperature of about 1200° C. and, while at 1200° C., was passed through a rolling mill to reduce the diameter of the cylindrical billet. The diameter of the cylindrical billet was reduced by the hot-rolling from about 190 mm to about 75 mm.

The hot-rolled cylindrical billet was maintained at a temperature of about 1200° C. and, while at 1200° C., passed through a piercing mill to form a seamless tube with a uniform wall thickness along the entire axis of the tube and circumferentially entirely around the tube.

After piercing, the tube was allowed to cool until the temperature of the tube reached room temperature. Once at room temperature, the thickness of the annular wall of the tube was reduced by cold drawing the tube. The thickness of the annular wall of the tube after cold drawing was about 3 mm.

The tube was then heat treated by heating the tube in a reheating furnace to a temperature of about 920° C. for about 20 minutes. The tube was then quenched with sprayed water and cooled to room temperature (i.e., about 25° C.) by placing the tube in an air atmosphere, which was at room temperature. Once the tube was at room temperature, the tube was tempered until the temperature of the tube reached about 500° C. Upon reaching a temperature of about 500° C., the tube was cooled to room temperature by placing the tube in an air atmosphere, which was at room temperature. The cooled tube was then cut to the desired length.

The tube so formed was tested in accordance with ASTM E8/E8M and DIN/EN 10002. The tube exhibited outstanding mechanical properties including a tensile strength of at least about 130,000 psi, a yield strength of at least about 104,000 psi, and an elongation at break of at least about 14%.

The ductility of the low-carbon steel tube at a temperature of about −40° C. was also tested by performing a hydraulic burst test at about −40° C. In the burst test, a sample of the low-carbon steel tube was cooled to a temperature of about −40° C. by placing the sample of the low-carbon steel tube in an ethyl alcohol bath that was mixed with dry ice. The temperature of the sample was measured with a thermocouple connected to a Fluke temperature indicator. Once the temperature of the sample decreased to about −40° C., the sample was removed from the bath and connected to a Haskel Hydro-pneumatic High Pressure Pump. An ethyl alcohol pressure medium, which was maintained at a temperature of about −40° C., was pumped by the high pressure pump into the low-carbon steel tube to increase the pressure within the low-carbon steel tube. The pressure within the low-carbon steel tube was measured using a Dynisco pressure transducer connected to a Daytronic strain gauge conditioner with a peak pressure detector. The pressure within the low-carbon steel tube was increased until the low-carbon steel tube burst. The time to burst was between about 20 and 30 seconds.

A visual inspection showed that there was no fracture propagation beyond the bulged area where the low-carbon steel tube burst. The absence of fracture propagation beyond the bulged area where the low-carbon steel tube burst indicates that the low-carbon steel tube remained ductile at a temperature down to about −40° C.

The low-carbon steel tube was also tested for susceptibility to hydrogen embrittlement and stress corrosion cracking.

The tube cut to the desired length was friction welded to an end cap, such as cap 22 (FIG. 5), of low-carbon steel and an end wall, such as wall 38, of low-carbon steel. The end wall was also welded to a diffuser, such as diffuser 52, of low-carbon steel. The composition of the low-carbon steel employed in the end cap, end wall, and diffuser was selectively controlled such that the low-carbon steel consisted essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron. By residual elements, it is meant the combined weight of additional elements including, for example, titanium, lead, niobium, cobalt, calcium, and/or tin.

A c-ring type specimen was removed from the welded portion of the housing and placed in a 3% NaCl saturated air atmosphere. The c-ring type specimen was maintained at 25° C. and subjected to 1.5V from a Ag/AgCl hydrogen cathode charging mechanism (NACE TM0177 Method C). Stress equivalent to 100% of the actual yield strength was applied to the c-ring sample for one month.

Analysis by thermal absorption spectrometry and scanning electron microscopy revealed no evidence of hydrogen embrittlement in the welded portion or base metal surrounding the welded portion of the c-ring type specimen after the one month period.

A c-ring type specimen was also removed from a welded portion of the housing and placed in a 3% NaCl saturated air atmosphere at 80° C. (NACE TM0177 Method C). Stress equivalent to 100% of the actual yield strength was applied to the c-ring sample for one month.

Analysis by thermal absorption spectrometry and scanning electron microscopy revealed no evidence of stress corrosion cracking in the welded portion or base metal surrounding the welded portion of the c-ring type specimen after the one month period.

Figure 9:
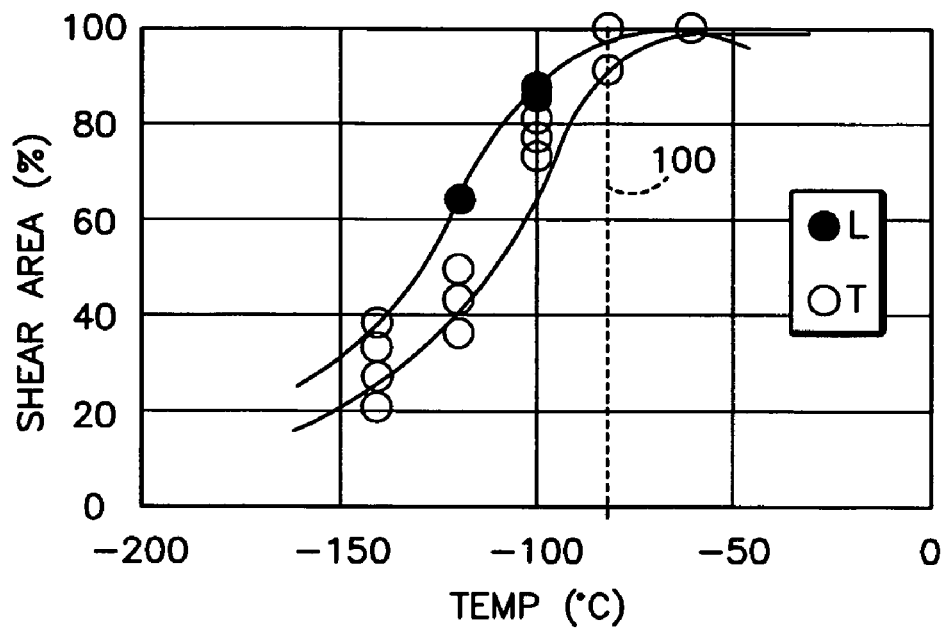
FIG. 9 illustrates plots showing the shear area percent relative to temperature for longitudinal and transverse specimens of low-carbon steel housing in accordance with the present invention evaluated with a Charpy-type notch bar impact test.

V-notch 10 mm×2.5 mm×2 mm specimens transverse and longitudinal to the length of the inflator housing were further removed from the inflator housing and flattened for evaluation. The flattened V-notch specimens were evaluated in a Charpy-type notched bar impact test. The shear area percentage as a function of temperature was measured for both the transverse and longitudinal specimens and plotted as shown in FIG. 9 to determine the maximum temperature of brittle area outbreak. FIG. 9 shows that the maximum temperature 100 for brittle area outbreak was about −80° C. (i.e., the earliest point on which the plots begin to slope).

Figure 10A:
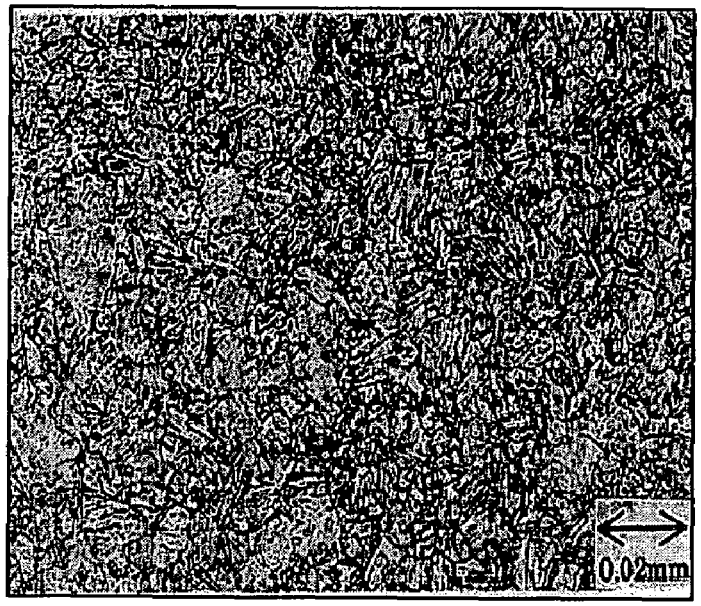
FIGS. 10A and 10B are photomicrographs of the grain structure of, respectively, transverse and longitudinal specimens of a low-carbon steel housing in accordance with the invention.
Figure 10B:
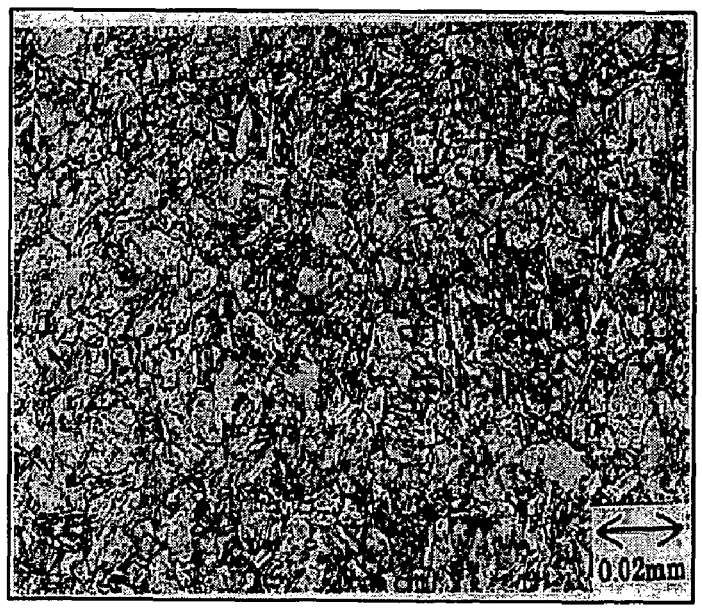

The plots for the transverse and longitudinal samples were similar. The similarity of the plots indicates that the grain of the transverse and longitudinal samples, and hence the grain structure of the low-carbon steel, had an essentially random orientation. This random orientation of the grain structure was confirmed by photomicrograph analysis. FIGS. 10A and 10B are photomicrographs of the grain structures, respectively, of the transverse and longitudinal specimens at 500× magnification. As is readily apparent from the photomicrographs, the sample had a random orientation grain structure both transverse and longitudinal to the length of the sample.

Comparative Example 2

A comparative low-carbon steel tube was prepared from a cylindrical billet that was cast using a low-carbon steel that had the same composition as the low-carbon steel of Example 2.

The process for producing the comparative low-carbon steel tube from the cylindrical billet, however, differed from the process of Example 2.

In the process, a cylindrical billet, which had a length of about 3 meters and a diameter of about 190 millimeters, was heated to a temperature of about 1200° C. and, while at 1200° C., was passed through a piercing mill to form a seamless tube with a uniform wall thickness along the entire axis of the tube and circumferentially entirely around the tube.

After piercing, the tube was allowed to cool until it reached room temperature. Once at room temperature, the thickness of the annular wall of the tube was reduced by cold drawing the tube. The thickness of the annular wall of the tube after cold drawing was about 3 mm.

The tube was annealed at a temperature of about 520° C. for about 45 minutes, cooled to room temperature, and cut to the desired length.

The comparative low-carbon steel tube so formed was tested in accordance with ASTM E8/E8M and DIN/EN 10002. The tube exhibited outstanding mechanical properties including a tensile strength of at least about 130,000 psi, a yield strength of at least about 104,000 psi, and an elongation at break of at least about 14%.

The ductility of the comparative low-carbon steel tube at a temperature of about −40° C. was also tested by performing a burst test at about −40° C. on the comparative low-carbon steel tube. In the burst test, a sample of the comparative low-carbon steel tube was cooled to a temperature of about −40° C. by placing the sample of the comparative low-carbon steel tube in an ethyl alcohol bath that was mixed with dry ice. The temperature of the sample was measured with a thermocouple connected to a Fluke temperature indicator. Once the temperature of the sample decreased to about −40° C., the sample was removed from the bath and connected to a Haskel Hydroneumatic High Pressure Pump. An ethyl alcohol pressure medium, which was maintained at a temperature of about −40° C., was pumped by the high pressure pump into the comparative low-carbon steel tube to increase the pressure within the comparative low-carbon steel tube. The pressure within the comparative low-carbon steel tube was measured using a Dynisco pressure transducer connected to a Daytronic strain gauge conditioner with a peak pressure detector. The pressure within the comparative low-carbon steel tube was increased until the comparative low-carbon steel tube burst. The time to burst was between about 20 and 30 seconds.

A visual inspection showed that there was fracture propagation beyond the bulged area where the low-carbon steel tube burst. The presence of fracture propagation beyond the bulged area where the low-carbon steel tube burst indicates that the low-carbon steel tube was brittle at temperatures of about −40° C.

Figure 11:
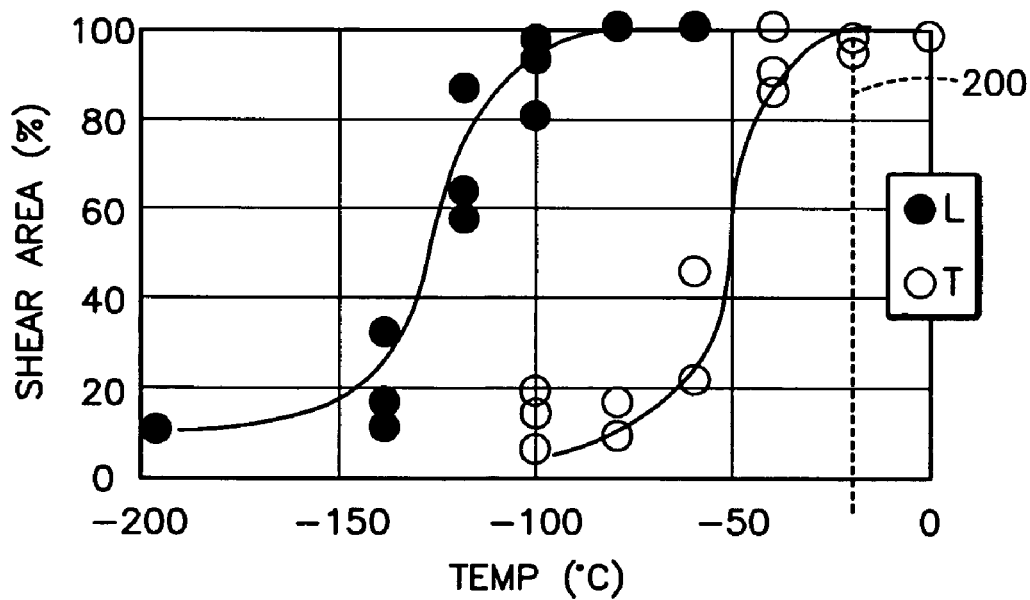
FIG. 11 illustrates plots showing the shear area percent relative to temperature for longitudinal and transverse specimens of a comparative low-carbon steel housing evaluated with a Charpy-type notch bar impact test.

V-notch 10 mm×2.5 mm×2 mm specimens transverse and longitudinal to the length of the inflator housing were further removed from the inflator housing and flattened for evaluation. The flattened V-notch specimens were evaluated in a Charpy-type notched bar impact test under similar conditions as the Charpy-type notched bar impact test used in the evaluation of Example 2. The shear area percentage as a function of temperature was measured for both the transverse and longitudinal specimens and plotted as shown in FIG. 11 to determine the maximum temperature of brittle area outbreak. FIG. 11 shows that maximum temperature 200 for brittle area outbreak of the transverse sample was substantially greater than −40° C. (i.e., the earliest point on which the plots begin to slope). This indicates the sample exhibits brittle behavior at temperatures greater than −40° C. (e.g., about −25° C.)

Additionally, the plot for the transverse sample is substantially displaced from the plot of the longitudinal sample. The substantial displacement of the plots indicates that grain structure of the sample, and hence the grain structure of the low-carbon steel, did not have a random orientation.

From the above description of the invention, those skilled in the art will perceive improvements, changes and modifications. Examples of changes include changes in the steel composition and changes in the processing of the steel composition. Such improvements, changes and modifications within the skill of the art are intended to be covered by the appended claims.

Having described the invention, the following is claimed:

1. An apparatus comprising a cold worked induction heated low-carbon steel member, the low-carbon steel member yielding plastically more than about 5% before fracturing at temperatures down to about −100° C. when stress sufficient to cause the low-carbon steel member to so yield is applied to the low-carbon steel member.

2. The apparatus of claim 1, the low-carbon steel member comprising an SAE-AISI 1010 grade carbon steel wherein the composition is controlled so that the weight percent of carbon does not exceed about 0.12%, the weight percent of sulfur does not exceed about 0.015%, the weight percent of phosphorous does not exceed about 0.020%, the weight percent of chromium does not exceed 1.30%, the weight percent of molybdenum does not exceed about 0.60%, and the combined weight percent of phosphorous and sulfur does not exceed about 0.025%.

3. The apparatus of claim 1, the low-carbon steel member consisting essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron.

4. The apparatus of claim 3, the low-carbon steel member having a tensile strength of at least about 130,000 psi, a yield strength of at least about 104,000 psi, and an elongation at break of at least about 14%.

5. An apparatus comprising a cold worked induction heated low-carbon steel member, the low-carbon steel member having a tensile strength of at least about 130,000 psi, a yield strength of at least about 104,000 psi, an elongation at break of at least about 14%, and yielding plastically more than about 5% before fracturing at temperatures down to about −100° C. when stress sufficient to cause the low-carbon steel member to so yield is applied to the low-carbon steel member.

6. The apparatus of claim 5, the low-carbon steel member comprising an SAE-AISI 1010 grade carbon steel wherein the composition is controlled so that the weight percent of carbon does not exceed about 0.12%, the weight percent of sulfur does not exceed about 0.015%, the weight percent of phosphorous does not exceed about 0.020%, the weight percent of chromium does not exceed 1.30%, the weight percent of molybdenum does not exceed about 0.60%, and the combined weight percent of phosphorous and sulfur does not exceed about 0.025%.

7. The apparatus of claim 5, the low-carbon steel member consisting essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron.

8. A method comprising the steps of:
casting a billet of low-carbon steel;
forming a low-carbon steel member from the cast billet of low-carbon steel,
cold working the low-carbon steel member after forming the low-carbon steel member but prior to finishing the low-carbon steel member; and
induction heating the low-carbon steel member to a temperature of at least about 900° C. after cold working the low-carbon steel member but prior to finishing the low-carbon steel member so that the low-carbon steel member yields plastically more than about 5% before fracturing at temperatures down to about −100° C. when stress sufficient to cause the low-carbon steel member to so yield is applied to the low-carbon steel member.

9. The method of claim 8, the low-carbon steel comprising an SAE-AISI 1010 grade carbon steel wherein the composition is controlled so that the weight percent of carbon does not exceed about 0.12%, the weight percent of sulfur does not exceed 0.015%, the weight percent of phosphorous does not exceed about 0.020%, the weight percent of chromium does not exceed about 1.30%, the weight percent of molybdenum does not exceed about 0.60%, and the combined weight percent of phosphorous and sulfur does not exceed about 0.025%.

10. The method of claim 8, the low-carbon steel consisting essentially of, by weight, about 0.07% to about 0.20% carbon, up to about 1.60% manganese, up to about 0.030% phosphorous, up to about 0.025% sulfur, about 0.06% to about 0.35% silicon, up to about 0.1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron.

11. The method of claim 10, the low-carbon steel member having a tensile strength of at least about 130,000 psi, a yield strength of at least about 104,000 psi, and an elongation at break of at least about 14%.

12. An apparatus comprising a cold worked induction heated low-carbon steel tube, the low-carbon steel tube yielding plastically more than about 5% before fracturing at temperatures down to about −100° C. when stress sufficient to cause the low-carbon steel tube to so yield is applied to the low-carbon steel tube.

13. The apparatus of claim 12, the low-carbon steel tube comprising an SAE-AISI 1010 grade carbon steel wherein the composition is controlled so that the weight percent of carbon does not exceed about 0.12%, the weight percent of sulfur does not exceed about 0.015%, the weight percent of phosphorous does not exceed about 0.020%, the weight percent of chromium does not exceed about 1.30%, the weight percent of molybdenum does not exceed about 0.60%, and the combined weight percent of phosphorous and sulfur does not exceed about 0.025%.

14. The apparatus of claim 12, the low-carbon steel tube consisting essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron.

15. The apparatus of claim 14, the low-carbon steel tube having a tensile strength of at least about 130,000 psi, a yield strength of at least about 104,000 psi, and an elongation at break of at least about 14%.

16. A method comprising the steps of:
casting a billet of low-carbon steel, the billet of low-carbon steel having a first diameter;
reducing the diameter of the billet of low-carbon steel by hot-rolling the billet;
forming a tube having an annular wall by piercing the billet;
reducing the thickness of the annular wall to a first thickness by cold drawing the tube;
induction heating the tube to a temperature of at least about 900° to form a low-carbon steel tube that yields plastically more than about 5% before fracturing at temperatures down to about −100° C. when stress sufficient to cause the low-carbon steel tube to so yield is applied to the low-carbon steel tube.

17. The method of claim 16, the low-carbon steel comprising an SAE-AISI 1010 grade carbon steel wherein the composition is controlled so that the weight percent of carbon does not exceed about 0.12%, the weight percent of sulfur does not exceed about 0.015%, the weight percent of phosphorous does not exceed about 0.020%, the weight percent of chromium does not exceed about 1.30%, the weight percent of molybdenum does not exceed about 0.60%, and the combined weight percent of phosphorous and sulfur does not exceed about 0.025%.

18. The method of claim 16, the low-carbon steel consisting essentially of, by weight, about 0.07% to about 0.20% carbon, up to about 1.60% manganese, up to about 0.030% phosphorous, up to about 0.025% sulfur, about 0.06% to about 0.35% silicon, up to about 1.20% chromium, up to about 0.65% nickel, up to about 0.70% molybdenum, up to about 0.35% copper, about 0.02% to about 0.06% aluminum, up to about 0.10% vanadium, up to about 0.25% residual elements, and the balance iron.

19. The method of claim 18, the low-carbon steel tube having a tensile strength of at least about 130,000 psi, a yield strength of at least about 104,000 psi, and an elongation at break of at least about 14%.

* * * * *